United States Patent [19]

Shepherd

[11] Patent Number: 5,097,637
[45] Date of Patent: Mar. 24, 1992

[54] MULTI-DISC CUTTER AND METHOD OF MANUFACTURE

[75] Inventor: Mark Shepherd, Hertfordshire, England

[73] Assignee: Xaar Limited, Cambridge, United Kingdom

[21] Appl. No.: 525,264

[22] Filed: May 16, 1990

[30] Foreign Application Priority Data

May 17, 1989 [GB] United Kingdom ............... 8911312

[51] Int. Cl.⁵ ........................................... B24D 18/00
[52] U.S. Cl. ....................................... 51/295; 51/293; 125/16.02; 204/129.1; 204/129.46; 219/69.12
[58] Field of Search ............... 51/295, 293; 125/16.01, 125/16.02; 204/129.1, 129.46; 219/69.12

[56] References Cited

U.S. PATENT DOCUMENTS

| | | | |
|---|---|---|---|
| 4,113,587 | 9/1978 | Chikamori | 204/129.1 |
| 4,379,042 | 4/1983 | Inoue | 125/16.01 |
| 4,438,312 | 3/1984 | Inoue | 219/69.12 |
| 4,929,256 | 5/1990 | Shepherd | 51/295 |

FOREIGN PATENT DOCUMENTS

| | | | |
|---|---|---|---|
| 0096725 | 6/1982 | Japan | 219/69.12 |
| 0288924 | 12/1986 | Japan | 219/69.12 |
| 0297012 | 12/1986 | Japan | 219/69.12 |
| 0064779 | 3/1989 | Japan | 51/295 |
| 1164563 | 6/1989 | Japan | 51/295 |

Primary Examiner—Robert A. Rose

[57] ABSTRACT

An integral abrasive cutting tool comprising a multiplicity of equally spaced parallel coaxial abrasive cutting discs is formed by rotating a cylindrical mandrel coated with a matrix of abrasive powder in a metal in a fluid bath. A wire is aligned tangentially with the coating and voltage pulses are applied therebetween while the wire is fed in its lengthwise direction past the coating. The wire is translated axially to each of a plurality of disc spacing locations and, at each such location, translated radially to effect electro erosion of the coating forming a channel therein. An abrasive cutting disc is thereby provided between each pair of successive channels.

17 Claims, 2 Drawing Sheets

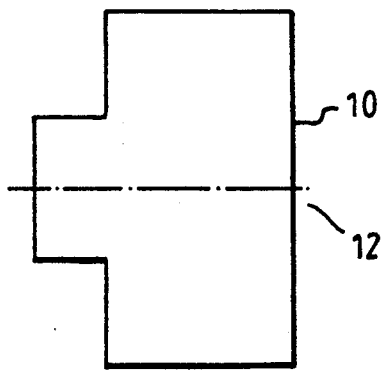
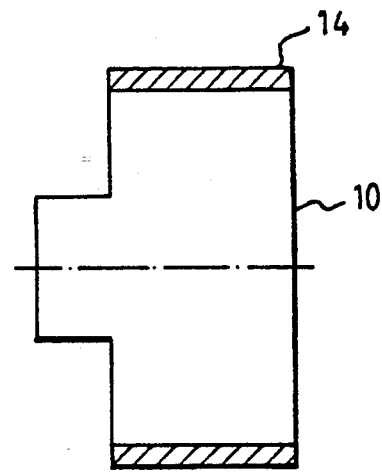
Fig. 1a         Fig. 1b
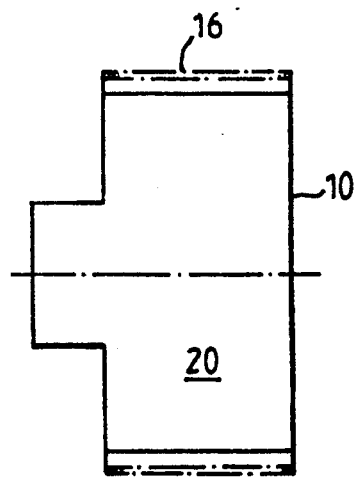
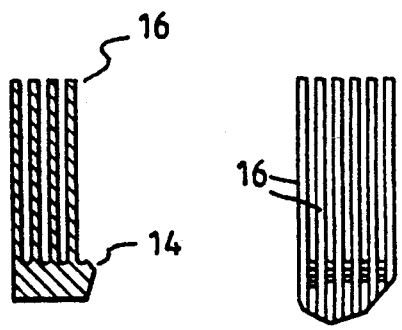
Fig. 1c         Fig. 1d     Fig. 1e

MULTI-DISC CUTTER AND METHOD OF MANUFACTURE

The present invention relates generally to novel abrasive cutting tools and their method of manufacture and particularly concerns a novel multi-disc cutter, its method of manufacture and its use in the manufacture of ink jet printheads.

Copending European patent Applications Nos. 88300144.8 and 88300146.3 both herein incorporated by reference disclose ink jet printheads having a plurality of linear, parallel ink cavities or channels formed in a pre-poled piezoelectric ceramic. In order to provide a printhead having the desired operating characteristics and print resolution, the dimensions of the ink cavities are quite small and their tolerances must be precisely controlled. A typical printhead may, for example, have ink cavities which are about 30-200 microns wide, by 150-1,000 microns deep, and a cavity pitch of about 75-500 microns. Hereinafter the term "high density" is used in relation to printheads having channels of or substantially of or greater than the cavity pitch referred to and to multi-disc cutting tools for making the same. Due to the linear cutting speeds achievable, the possibility of channel depth profiling and the manufacturing tolerances required, the use of diamond abrasive cutting discs is presently preferred to form the ink cavities.

Thin diamond impregnated abrasive cutting discs are widely used for dicing ceramic wafers, for example, wafers of silicon chips, piezoelectric and magnetic ferrite actuators and for cutting multi-layer capacitors, etc. One form of blade is the resin bonded abrasive diamond grain disc. A multi-disc form is described in copending European application No. 88308515.1.

Diamond impregnated metal discs are known to be superior, due to their higher fatigue resistance, owing to superior mechanical and thermal properties. In one technique these wheels are made by electrodeposition of Ni in a diamond slurry onto a plane electrically conducting surface. This method provides excellent uniformity of thickness, but the discs have a tendency to wear faster on one face, attributable to plating stresses and a difference in the diamond structure on the initial and finally deposited face. Plasma sprayed metal and diamond provides an alternative manufacturing technique. These methods do not lend themselves to the production of multiple disc cutters.

It is known to assemble multiple single disc cutters between spacers on a common shaft, but it has been found difficult to mount more than a few aligned precisely true to a common axis, due to the tolerances required, and the difficulty of handling the fragile components reliably; as well as difficulties arising from the laterally non-uniform wear of each blade face to face which compromise the effective life of a multiple disc cutter, particularly for the purpose of forming the ink cavities of a printhead in the extremely fine dimensions described and in quantities one or a few hundred in one pass.

It is now a basic objective of the present invention to provide an improved multi-disc abrasive cutting tool and a method for its manufacture. It is a more specific objective of the invention to provide an improved abrasive cutting tool particularly adapted to mass production of ink jet printheads. It is yet a further objective to provide a highly uniform and precise abrasive cutting tool for efficiently cutting a multiplicity of linear parallel ink jet ink cavities of the form and dimensions described in a piezoelectric ceramic ink jet printhead substrate.

The present invention consists in one aspect, in the method of making an integral abrasive cutting tool comprising a multiplicity of equally spaced parallel coaxial abrasive cutting discs having controlled dimensions characterised by:

(a) forming a cylindrical mandrel having at least an external peripheral coating made with abrasive powder in a matrix of metal;

(b) rotating said mandrel about its longitudinal axis in a fluid bath;

(c) aligning a length of wire tangentially with said coating;

(d) applying between the wire and the coating voltage pulses to effect electro erosion of said coating whilst feeding said wire in the lengthwise direction thereof to maintain a substantially constant wire diameter in the event of electro erosion thereof the wire diameter being chosen according to the spacing between said discs; and (e) translating said wire axially to each disc spacing location and thereat translating said wire radially relatively to said coating to form a channel in said coating by electro-erosion thereof whereby an abrasive cutting disc is formed between successive channels so formed.

In one form of the invention, said step of forming a coating comprises electro deposition of diamond powder, or other abrasive powder, in nickel or a nickel alloy.

In a further form of the invention, said step of forming a coating comprises plasma deposition of diamond, or other abrasive powder, in a metal matrix.

In yet a further form of the invention, said step of forming a coating comprises sintering diamond, or other abrasive powder, in a metal matrix onto said cylindrical mandrel.

In another form of the invention, said step of forming a peripheral coating includes dressing said coating to form a right circular cylinder surface of said mandrel concentric to the rotation axis thereof.

The present invention further includes the method of forming a plurality of abrasive cutting tools by rotating a plurality of coaxial cylindrical coated mandrels about a common longitudinal axis in said bath, and aligning a plurality of lengths of wire tangentially respectively with each mandrel, each wire being fed in the lengthwise direction thereof whilst applying electro-erosion voltages between said wires and the respective mandrels aligned therewith and translated in the radial direction of the corresponding mandrel to form a channel in the coating of said corresponding mandrel thereby to form a separate abrasive cutting disc between successive channels so formed.

According to a further aspect of the present invention, the step of translating said wire radially to control the radial depth of electro erosion of said channels includes translating the wire to a depth exceeding the coating thickness of said diamond matrix on the said mandrel.

The present invention, according to a further aspect, comprises an abrasive cutting tool having a multiplicity of equispaced parallel coaxial abrasive cutting discs, and comprising a generally cylindrically shaped cutting head coated with a matrix of abrasive powder in a metal, said cutting head having equispaced parallel coaxial channels, successive channels forming therebetween a respective annular abrasive cutting disc.

In still a further aspect, the present invention consists in the method of making an integral abrasive cutting tool comprising a multiplicity of equally spaced parallel coaxial abrasive cutting discs having controlled dimensions characterised by:

(a) forming a cylindrical mandrel having at least an external peripheral coating made with a matrix of abrasive powder in a metal;

(b) rotating said mandrel about its longitudinal axis in a fluid bath;

(c) at a plurality of disc spacing locations, aligning a continuous wire tangentially with said coating and applying therebetween voltage pulses to effect electro erosion of said coating whilst feeding said wire in the lengthwise direction thereof to maintain a substantially constant wire diameter in the event of electro erosion thereof the wire diameter being chosen according to the spacing between said discs; and (d) translating said wire radially relatively to said coating at the rate of axially symmetric electro erosion of said coating to form progressively at each disc spacing location a channel of controlled radial and axial dimensions, whereby an abrasive cutting disc is formed between successive channels so formed.

The invention will now be described by way of example with reference to the accompanying diagrams, in which:

FIG. 1(a) illustrates a cylindrical mandrel former of a cutting tool;

FIG. 1(b) illustrates the mandrel coated with abrasive powder and dressed;

FIG. 1(c) illustrates the mandrel after forming in the coating a multiplicity of abrasive cutting discs;

Figure 2:
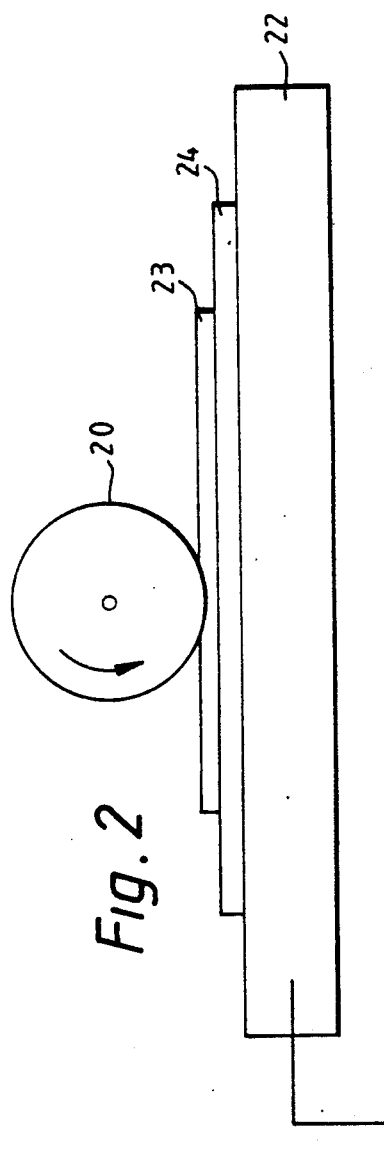
Figure 3:
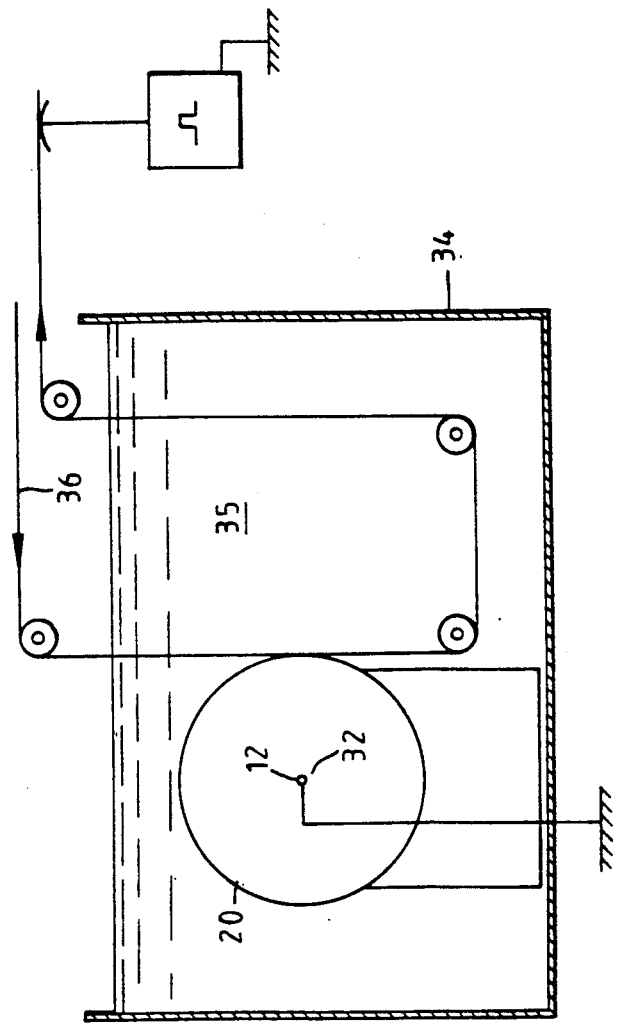

FIGS. 1(d) and (e) are scrap sectional and elevational views to an enlarged scale of a detail of the abrasive cutting discs;

FIG. 2 is an end elevational view which illustrates a method of using the cutter of FIG. 1 to form a plurality of ink cavities in the piezoelectric substrate of an ink jet printhead; and FIG. 3 illustrates the method of forming the multi-disc abrasive cutter using electro erosion formed with a continuous wire cutting tool.

FIGS. 1(a) to 1(e) illustrate a cylindrical mandrel former 10, typically of tool steel, mounted on an axis 12. The mandrel carries a multiplicity of abrasive grain discs and is used in one form of the present invention to cut, in one step, suitably a relative few to a thousand ink cavities for a multi-channel ink jet printhead as described in the copending European applications referred to.

Ultrathin cutting blades hitherto, have been formed as single discs of diamond or boron nitride grain of size 2–20 μm. in a metal matrix. The metal matrix provides superior performance due to better mechanical and thermal properties, but high uniformity is necessary to assure long life against fatigue. This is especially necessary when a large number of blades are combined in one tool.

To perform the present invention the mandrel 10 is coated with abrasive grains in a metal matrix. The coating 14 illustrated in FIG. 1(b) is applied, for example, by electro deposition or plasma spraying. An alternative method is by metal sintering. Diamond grain in a nickel matrix is preferred, but other grains (cubic boron nitride) and different metals (nickel cobalt alloy) may be adopted. After coating, the tool head is dressed forming a cylinder true to the mandrel axis, and is balanced to eliminate vibration during use as an abrasive cutter.

After forming the tool head a multiplicity of abrasive discs 16 are formed coaxially in the cylindrical mandrel. The process is described later by reference to FIG. 3. When formed these have a finished diameter of typically 30–75 mm., and are profiled to cut abrasively the printhead channels. In one arrangement the discs abrade every channel at the same time in one pass. In another form alternate channels are cut in two successive passes. The channels between the discs 16 are preferably cut into the thickness of the diamond metal coating 14, so that the sides as well as the tips of the discs are formed by abrasive grains, but the channels can also be cut deeper than the coating 14 so that only the radially outer part or merely the tips of the discs 16 are abrasive.

The multi-disc cutter 20, when used to form the parallel ink channels is illustrated in FIG. 2. Here the cutter 20 is mounted in a suitable grinding machine 22 and rotated at high speed typically 50–150 ms$^{-1}$. A sheet of piezoelectric ceramic substrate 23 is mounted on the machine bed 24 and translated longitudinally under direction of a controller 26, at a preselected speed and also radially. This is chosen to optimize blade life and to ensure that the quality of the abraded surface is of sufficient planarity for electrode plating. The disc cutter during abrasion is plied with coolant. Also the cutter discs may be optically inspected from time to time during cutting to maintain their location relative to the ceramic substrate 23, and to identify wear or breakage of the cutter discs.

One method of forming the discs is illustrated by reference to FIG. 3. The multi-disc cutter 20 having the coating 14 is mounted at its axis 12 on shaft 32 and rotated immersed in bath 34 containing an insulating oil 35 or other suitable fluid. A wire 36 is placed tangentially to the cutter 20 and fed progressively along its length. At the same time voltage pulses are applied between the wire 36 and the cutter 20, which is held at ground potential, to effect electro erosion. This forms cavitation bubbles at each pulse which collapse and effect erosive machining. Electro erosion has been applied previously to dress and profile abrasive tools but has not been applied to form multi-disc cutters and particularly such cutters providing a relative few to a thousand coaxial discs.

During electro erosion machining the wire 36 is fed progressively along its length at a rate chosen to preserve a substantially constant wire diameter, despite electro erosion thereof. At the same time the wire is translated relative to the mandrel 10 in the radial direction of the mandrel to form a channel. At the completion of each channel the wire is withdrawn from the channel and indexed axially to the next disc spacing location where a further channel is formed in like manner to the original channel. The procedure is then repeated so that abrasive discs are formed each between successive channels. The discs may be wholly formed in the mandrel coating or may extend radially inwards beyond the coating so that only radially outer parts of the discs comprise abrasive material. The discs preferably have a uniform spacing at the desired channel pitch (or a multiple of the pitch). Where the channels are cut in a series of passes the size of each of the wires 36 is chosen to provide the correct spacing between discs on the cutter.

In machining for making multiple abrasive heads, it is convenient to mount multiple mandrels coaxially on the shaft 32 and to provide multiple wires 36 which are each translated together at the same time radially to form the channels and axially of the mandrel to move the wires to respective new disc spacing locations as well as longitudinally whilst the erosion pulses are applied. Multiple wires may also be employed in the making of a single cutting tool and, in this case, the axial translations may be reduced in number or removed entirely.

When a cutter is to be provided with discs at high density, it is desirable first to cut alternate disc channels which are then filled with wax prior to cutting the remaining disc channels. In this way one face of each disc is supported whilst the other face thereof is cut. After the latter cut is made the wax is removed.

The manufacture of an integral multi-disc cutter according to the invention results in a cutter of which the cost per disc is very much cheaper than—possibly an order of magnitude cheaper than—the cost of discs employed in a multi-disc cutter in which individual discs and spacers are coaxially assembled in a stack.

I claim:

1. The method of making an integral abrasive cutting tool comprising a multiplicity of equally spaced parallel coaxial abrasive cutting discs having controlled dimensions characterised by:
   (a) forming a cylindrical mandrel having at least an external peripheral coating made with abrasive powder in a matrix of metal;
   (b) rotating said mandrel about its longitudinal axis in a fluid bath;
   (c) aligning a length of wire tangentially with said coating;
   (d) applying between the wire and the coating voltage pulses to effect electro erosion of said coating whilst feeding said wire in the lengthwise direction thereof to maintain a substantially constant wire diameter in the event of electro erosion thereof the wire diameter being chosen according to the spacing between said discs; and
   (e) translating said wire axially to each disc spacing location and thereat translating said wire radially relatively to said coating to form a channel in said coating by electro-erosion thereof whereby an abrasive cutting disc is formed between successive channels so formed.

2. The method claimed in claim 1, characterised by translating said wire radially relatively to said coating so as to effect axially symmetric electro-erosion of said coating.

3. The method according to claim 1 characterised by forming said coating by electro deposition of diamond powder in nickel or a nickel alloy.

4. The method claimed in claim 1 characterised by forming said coating with a matrix of diamond powder in metal.

5. The method according to claim 4, characterised by forming said coating by plasma deposition of diamond powder in a metal matrix.

6. The method of making an integral abrasive cutting tool comprising a multiplicity of equally spaced parallel coaxial abrasive cutting discs having controlled dimensions characterised by:
   (a) forming a cylindrical mandrel having at least an external peripheral coating made with abrasive powder in a matrix of metal;
   (b) rotating said mandrel about its longitudinal axis in a fluid bath;
   (c) aligning a length of wire tangentially with said coating;
   (d) applying between the wire and the coating voltage pulses to effect electro erosion of said coating whilst feeding said wire in the lengthwise direction thereof to maintain a substantially constant wire diameter in the event of electro erosion thereof, the wire diameter being chosen according to the spacing between said discs;
   (e) forming one side of alternate discs by translating said wire axially to alternate disc spacing locations and thereat translating said wire radially relatively to said coating to form a plurality of channels in said coating by electro erosion thereof;
   (f) filling the channels so formed with disc supporting material;
   (g) forming the other side of each of said alternate discs by translating said wire axially to each disc spacing location intermediate a successive pair of said alternate locations and thereat translating said wire radially relatively to said coating to form a plurality of channels in said coating by electro erosion thereof; and
   (h) removing said disc supporting material, whereby an abrasive cutting disc is formed between successive channels so formed.

7. The method according to claim 1 characterised by forming said coating by sintering diamond powder in a metal matrix onto said mandrel.

8. The method according to claim 1 characterised by forming a plurality of abrasive cutting tools by rotating a plurality of coaxial cylindrical coated mandrels about a common longitudinal axis in said bath, and aligning a plurality of lengths of wire tangentially respectively with each mandrel, each wire being fed in the lengthwise direction thereof whilst applying electro-erosion voltages between said wires and the respective mandrels aligned therewith and translated in the radial direction of the corresponding mandrel to form a channel in the coating of said corresponding mandrel thereby to form a separate abrasive cutting disc between successive channels so formed.

9. The method according to claim 1 characterised by forming the erosion of said channels greater than the coating depth of said matrix of the or each mandrel.

10. The method claimed in claim 1 characterised by forming said multiplicity of discs at high density.

11. The method of making an integral abrasive cutting tool comprising a multiplicity of equally spaced parallel coaxial abrasive cutting discs having controlled dimensions characterised by:
    (a) forming a cylindrical mandrel having at least an external peripheral coating made with a matrix of abrasive powder in a metal;
    (b) rotating said mandrel about its longitudinal axis in a fluid bath;
    (c) at a plurality of disc spacing locations, aligning a continuous wire tangentially with said coating and applying therebetween voltage pulses to effect electro erosion of said coating whilst feeding said wire in the lengthwise direction thereof to maintain a substantially constant wire diameter in the event of electro erosion thereof the wire diameter being chosen according to the spacing between said discs; and (d) translating said wire radially relatively to said coating at the rate of axially symmetric electro erosion of said coating to form progressively at each disc spacing location a channel of controlled radial and axial dimensions, whereby an abrasive cutting disc is formed between successive channels so formed.

12. The method according to claim 11, characterised by forming said coating by electro deposition on said mandrel of diamond powder in nickel or a nickel alloy.

13. The method claimed in claim 11, characterised by forming said coating with a matrix of diamond powder in metal.

14. The method claimed in claim 11, characterised by forming said coating by plasma deposition of diamond powder in a metal matrix.

15. The method claimed in claim 11, characterised by forming said coating by sintering diamond powder in a metal matrix onto said mandrel.

16. The method according to claim 11, characterised by forming the erosion of said channels greater than the coating depth of said matrix on the mandrel.

17. The method according to claim 11, characterised by forming said multiplicity of discs at high density.

* * * * *